(12) United States Patent
Chatterjee et al.

(10) Patent No.: US 6,197,886 B1
(45) Date of Patent: *Mar. 6, 2001

(54) COMPOSITIONS CONTAINING IMPACT COPOLYMERS MADE FROM A BLEND OF A HOMOPOLYMER PHASE AND A RUBBER PHASE HAVING A HIGH ETHYLENE CONTENT

(75) Inventors: Ananda Mohan Chatterjee, Katy; James Douglas McCullough, Jr., Houston, both of TX (US)

(73) Assignee: Union Carbide Chemicals & Plastics Technology Corporation, Danbury, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/957,602

(22) Filed: Oct. 24, 1997

(51) Int. Cl.⁷ .............................. C08L 23/12; C08L 23/16
(52) U.S. Cl. .................... 525/240; 525/240; 525/323
(58) Field of Search ................................. 525/240, 323

(56) References Cited

U.S. PATENT DOCUMENTS

| | | | |
|---|---|---|---|
| 4,087,486 | 5/1978 | Fielding et al. | 260/897 A |
| 4,254,237 | 3/1981 | Shiga et al. | 525/323 |
| 4,375,531 * | 3/1993 | Ross | 525/240 |
| 4,634,740 | 1/1987 | Fujita et al. | 525/240 |
| 4,734,459 | 3/1988 | Cecchin et al. | 525/247 |
| 5,066,723 * | 11/1991 | Randall, Jr. et al. | 525/323 |
| 5,124,193 | 6/1992 | Sano et al. | 428/220 |
| 5,250,631 | 10/1993 | McCullough, Jr. | 525/322 |
| 5,302,653 * | 4/1994 | Nishio et al. | 525/240 |
| 5,362,782 | 11/1994 | McCullough, Jr. et al. | 524/108 |
| 5,374,677 * | 12/1994 | Nishio et al. | 525/240 |
| 5,468,809 | 11/1995 | Ghisellini et al. | 525/240 |
| 5,541,260 | 7/1996 | Pelliconi et al. | 525/240 |
| 5,571,619 | 11/1996 | McAlpin et al. | 428/364 |
| 5,854,354 * | 12/1998 | Ueda et al. | 525/240 |
| 5,898,050 * | 4/1999 | Shih et al. | 525/240 |
| 5,910,539 * | 6/1999 | Matsunaga et al. | 525/88 |
| 5,928,762 * | 7/1999 | Aizawa | 525/240 |
| 6,015,854 * | 1/2000 | McCollough, Jr. | 525/240 |
| 6,028,145 * | 2/2000 | Niebergall et al. | 525/240 |

FOREIGN PATENT DOCUMENTS

| | | |
|---|---|---|
| 0316692 | 5/1989 | (EP) . |
| 0373660 | 6/1990 | (EP) . |

OTHER PUBLICATIONS

Kakugo, Masahiro & Hajime Sadatoshi, "Impact–Resistant Polypropylene", *Journal of Sumitomo Chemical Co.*, 1979, pp. 22–32.
9635751, Nov. 1996, Abstact—WO.
8027238, JP—Abstract.
8151418, JP—Abstract.
8165385, JP—Abstract.
8165386, JP—Abstract.
8165400, JP—Abstract.

* cited by examiner

*Primary Examiner*—Donald R. Wilson
(74) *Attorney, Agent, or Firm*—P. A. Doody

(57) ABSTRACT

The present invention relates to compositions containing impact copolymer compositions that are a blend of a propylene polymer phase and a rubber phase in which the ethylene content of the rubber phase is between about 75 to about 95% by weight. The rubber content of the impact copolymer composition ranges between about 35% by weight to about 60% by weight. The crystallinity of the high ethylene-content rubber phase provides overall improvement in film properties and also balance of film tensile properties in the machine and transverse directions. Compared to traditional impact copolymer compositions having a low ethylene content-rubber phase, the inventive copolymers have significantly enhanced melting and crystallization peaks due to polyethylene-like crystallinity in the rubber phase.

9 Claims, 14 Drawing Sheets

COMPOSITIONS CONTAINING IMPACT COPOLYMERS MADE FROM A BLEND OF A HOMOPOLYMER PHASE AND A RUBBER PHASE HAVING A HIGH ETHYLENE CONTENT

FIELD OF THE INVENTION

This invention relates to polypropylene impact copolymer compositions having improved film properties, including balance of tensile and tear properties.

BACKGROUND OF THE INVENTION

Impact polypropylene has seen wide use over the years with many applications. For example, EP Patent No. 557853 discloses compositions that comprise 25–95 parts crystalline random propylene-ethylene copolymer having a propylene content greater than 85% and haze less than 25%, and 5–75 parts of an elastomeric copolymer of ethylene with propylene.

However, the known impact copolymers do have physical property limitations. For example. with cast films made from known impact copolymers, the films are relatively hard, noisy, and tear readily. Thus, impact copolymers which rectify these physical shortcomings are desirable.

SUMMARY OF THE INVENTION

The present invention teaches propylene-ethylene impact copolymers of about 5 to about 50 g/10 min melt flow index that have a propylene homopolymer phase combined with a copolymer rubber phase in which the ethylene content of the rubber ($E_c$) is between about 78 to about 95% w. The rubber content of the copolymer ($F_c$) being ranges between about 25% w to about 60% w. The higher rubber crystallinity provides improvement in and balance of film tensile properties in the machine and transverse directions.

DETAILED DESCRIPTION OF THE INVENTION

Composition

Figure 1:
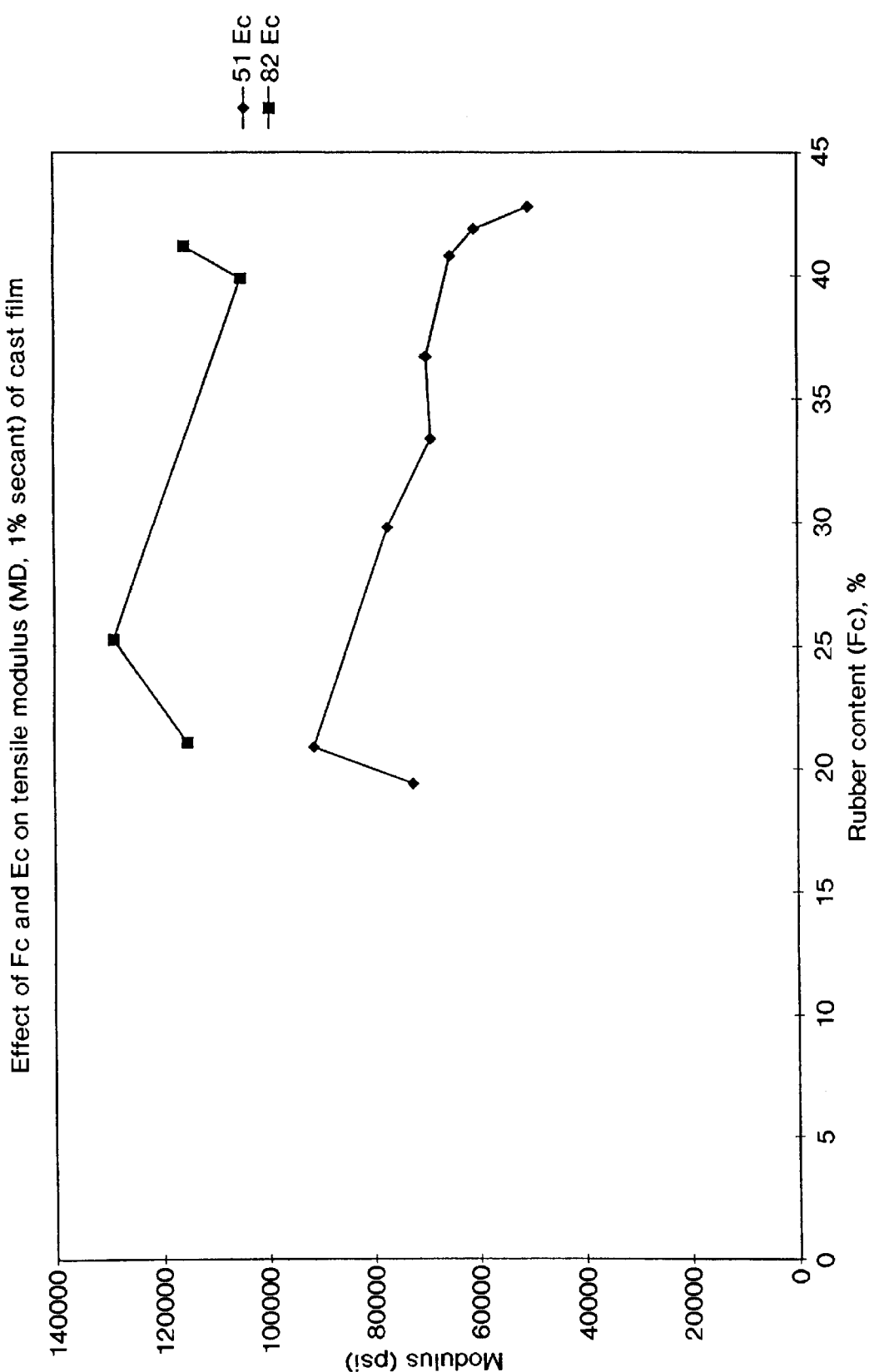
FIGS. 1–14 illustrate properties of copolymers as discussed in the examples.

The homopolymer phase of the impact copolymer is preferably propylene homopolymer, but may contain up to 5% w of comonomer, including but not limited to C2, and C4–C8 alpha-olefins, such as 1-butene and ethylene, and dienes, such as 5-ethylidene-2-norbornene (ENB), and 7-methyl-1,6 octadiene. The mole ratio of olefin to propylene is about 0 to about 0.06 and, preferably, when present, is about 0.015 to about 0.04.

The rubber phase of the impact copolymer is a copolymer of ethylene and propylene. The $E_c$ of the rubber phase is between about 78% w to about 95% w, more preferably between about 80% w and about 84% w. In this $E_c$ range the rubber phase is at least moderately crystalline in terms of polyethylene-type crystallinity, yet it is not so crystalline as high density polyethylene (HDPE). The desired level of ethylene can be determined by infrared analysis through conventional means, and the presence of polyethylene-type crystallinity can be ascertained by virtue of strong absorption near or at 729 cm$^{-1}$ in the infrared spectrum, with C. Tosi and F. Ciampelli, "Applications of Infrared Spectroscopy to Ethylene-Propylene Copolymers," Advances in Polymer Science, vol. 12, p. 97, Springer-Verlag (1973) being an appropriate reference.

The $F_c$ ranges between about 25% w to about 60% w and preferably about 40% w to about 50% w. The melt flow (MF) of the copolymer is between about 5 to 50 dg/min, preferably about 10 to about 30 g/10 min by either reactor or controlled rheology (visbreaking) modes.

The ratio of intrinsic viscosity of the rubber phase to the intrinsic viscosity of the homopolymer phase ("IVR"), also called β/α, should be between about 0.8 to about 1.6 and preferably about 1.3 to about 1.6. β/α may be calculated as follows:

$$\beta/\alpha = 1 + \left[\frac{1}{F_c}\left[\frac{MF \text{ homopolymer}}{MF \text{ copolymer}}\right]^{0.213} - 1.0\right]$$

The copolymers may be cracked to achieve specific melt flows. However, it is preferred that the cracking ratio (i.e., melt flow after cracking to melt flow before cracking) be limited to less than about 2. Said cracking may be accomplished with alkyl peroxides such as 2,5-dimethyl-2,5-bis(t-butylperoxy)hexane or other peroxidic species.

Additives

The compositions of the invention also may contain additives which may be generally termed stabilizers, antioxidants, lubricants, acid acceptors, synergists, anti-static agents, nucleating additives and additives which stabilize against radiation, such as ultraviolet (UV) stabilizers and those that provide resistance to gamma irradiation. Antioxidants include the sub-classes of primary and secondary types; examples of primary antioxidants include the phenolic-type additives typified by IRGANOX 1010, IRGANOX 3114 and ETHANOX 330. Their main function is to provide long-term thermal stability such as is often needed in fabricated articles. Secondary antioxidants (or stabilizers) include those additives that contain phosphorus in either organo phosphite or organo phosphonite configurations. Examples of phosphites include IRGAFOS 168, ULTRANOX 626, ULTRANOX 627A, ULTRANOX 641, DOVERPHOS S-9228 and IRGAFOS 12. ETHANOX 398 is an exemplary fluorophosphonite. Organo phosphonite secondary antioxidants are typified by P-EPQ. Other secondary antioxidants are exemplified by lower molecular weight phenolic-types such as BHT or IRGANOX 1076, or hydroxyl amines such as distearylhydroxyl amine. Secondary antioxidants function mainly by providing needed stability in melt flow and color during the melt processing of the plastic material. Another class of secondary antioxidants comprises the benzofuranone (lactone) derivatives as represented by Ciba Specialties' HP-136. Lubricants or mold release agents are typified by fatty acid amides, examples of which include ethylene bis stearamide, oleamide and erucamide. Acid acceptors may be categorized as salts of fatty acid, lactic acid salts and related derivatives, hydrotalcite-like compounds, and certain metal oxides. Examples of each type in order include calcium stearate, calcium lactate, DHT-4A, and zinc or magnesium oxide. Synergists enhance the performance of primary antioxidants. Examples include the thioesters of fatty acids typified by DSTDP, DLTDP and DMTDP. Anti-static agents enhance static decay on molded parts. Key examples include glyceryl monostearate and glyceryl distearate, as well as mixtures thereof. Nucleating additives are typified by benzoic acid salts such as sodium, lithium or aluminum benzoate, minerals such as talc, and organo phosphorus salts such as NA-11 and MARK 2180. Ultraviolet stabilization is provided by light absorbers such as TINUVIN 327 or by hindered amine types such as CYASORB UV 3346, TINUVIN 622, TINUVIN 770 DF and CHIMASSORB 944. Resistance against gamma irradiation is provided by combinations of additives such as phosphorous containing secondary antioxidants or the lactone type (e.g. HB-136), and hindered amines. Additionally, Milliken's RS 200 additive is of benefit, as are mobilizing additives such as mineral oil (cited in U.S. Pat. Nos. 4,110, 185 and 4,274,932). The latter is used in combination with a non-phenolic secondary antioxidant and a hindered amine.

Preferred antioxidants include 1,3,5-trimethyl-2,4,6-tris (3,5-di-tert-butyl-4-hydroxy-benzyl) benzene (A); octadecyl 3-(3',5'-di'tert'butyl-4'-hydroxyphenyl) propionate (B); tetrakis[methylene (3,5-di-tert-butyl-4-hydroxyhydrocinnamate)] methane (C); tris[3,5-di-t-butyl-4-hydroxybenzyl) isocyanurate (D); 3,5-di-tert-butyl-4-hydroxyhydrocinnamic acid triester with 1,3,5-tris(2-hydroxyethyl)-s-triazine-2,4,6(1H,3H,5H)-trione (E); 1,3,5-tris-(4-tert-butyl-3-hydroxy-2,6-dimethylbenzyl) 1,3,5-triazine-2,4,6-(1H,3H,5H)-trione (F); bis-[3,3-bis (4'hydroxy-3'tert-butyl-phenyl)-butanoic acid]-glycolester (G); 2,2'-methylene-bis-(4-methyl-6-tertiary-butylphenol)-terephthalate (H); and 2,2 bis [4-(2-(3,5-di-tert-butyl-4-hydroxyhydrocinnamoyloxy)) ethoxy-phenyl]propane (I); calcium bis[monoethyl(3,5-di-tert-butyl-4-hydroxybenzyl) phosphonate] (J); 1,2-bis(3,5-di-tert-butyl-4-hydroxyhydrocinnamoyl)hydrazine (K); and 2,2-oxamido bis[ethyl 3-(3,5-di-tert-butyl-4-hydroxyphenyl)propionate] (L).

Additional additives may be used separately or blended with the above listed antioxidants. This applies to all the above additive types and further includes fillers like barium sulfate, clays, calcium carbonate, silicates, pigments, such as titanium dioxide, zinc oxide, lead chromate, cadmium sulfides, cadmium selenide, zinc sulfide, basic carbonate of white lead; stabilizers such as tribasic lead sulfate, basic lead chlorosilicate, dibutyl tin oxide and other salts of lead, zinc, cadmium, tin, and the like; flame retardants such as antimony oxide; ultra-violet stabilizers, slip agents, anti-block agents, and other solid additives which enhance the properties and processability of the impact copolymer to which they are added.

While the above listing seeks to provide key examples of the different additive types, it is not to be viewed as limited by the examples in scope. It is also recognized that certain of the above additives are multi-functional, e.g., an acid acceptor such as calcium stearate may also provide mold release performance, as may also be the case with glyceryl monostearate. Further, combinations of any or all types of additives given, or of additives within a given class, are considered to be within the scope of the present invention.

Properties

Preferably, the impact copolymers of high $F_c$ and high $E_c$ at 2 mil thick film have haze according to ASTM D-1003 of less than about 30%, preferably less than about 25%, which is lower than that of comparable films with low $E_c$ or high $F_c$ and low $F_c$.

The copolymers have low, i.e., <2.6% w, hexane extractables at 50° C. as tested pursuant to 21 CFR 177.1520. Thus, these copolymers may be used in food applications involving use with cooking.

The crystallinity of the rubber phase, $X_c$, is between about 2%–15%; $X_c$=100 H/Ho, where H is the measured heat of fusion and Ho is the heat of fusion of ideal 100% crystalline polyethylene (70 cal/gm). The homopolymer is highly crystalline, i.e., having a xylene solubles after cooling to 23° C. of less than about 5% w. The combined crystallinity of homopolymer and rubber phases gives unique properties for these materials.

The ratio of tensile properties in the machine direction (MD) and transverse direction (TD) is according to ASTM D-882-90 about 0.5 to 1.5 and preferably about 1, except where the polymer is visbroken.

Additionally, cast films made from the impact copolymers of the present invention have particularly advantageous properties. Desirable balance of film properties is achieved with the present invention. Since the tensile strength at break (ASTM D-882) is about 100 to 200% higher in the copolymers of the present invention than in comparative low $E_c$ material, in both MD and TD, a higher $F_c$ material may be used and still have sufficient film strength. The puncture resistance by Instron at 10 inch/minute (25.4 cm/min) crosshead speed is improved at high $E_c$ levels, as compared to lower $E_c$ level material.

Moreover, the copolymers of the present invention, surprisingly, have two prominent melting peaks measured by DSC (differential scanning calorimeter), one representing the homopolymer phase and the other, the rubber phase. The crystallization temperature (Tc) of the rubber phase is at least about 107° C. and melting temperature (Tm) is at least about 125° C. The crystallization temperature of the homopolymer phase is about 114° C. and the melting temperature is at least about 162° C. With increasing $E_c$ the secondary melting peak ("$E_c$ peak") of the impact copolymer is enhanced, and the Tm and Tc of the rubber phase increases. This peak is due to polyethylene-like crystallinity in the rubber phase and may be seen in FIGS. 13 and 14, especially when compared to FIGS. 11 and 12 (see examples). The distinct $E_c$ peak has morphological implications, e.g., at high supercoolings isotactic polyethylene can crystallize on polypropylene surface. See A. G. M. Last, *J. Polym. Sci.*, 39, 543 (1959). High supercooling is reached during film casting on chill roll.

Utility

The impact copolymers may be used for films and laminations thereof of all types. The low hot hexane solubles content enables the copolymers to be used for cooking applications. The microwavability of materials of the invention provides added convenience for food preparation.

Typical film types include cast, oriented (mono and biaxial), unoriented, tubular water quench and other conversion processes as are known in the art. Within a given category, e.g. oriented film, there are various processes such as tenter frame and blown film (e.g. double-bubble), that may be used herewith. The copolymers may be combined with other polymer layers in the art to form specific film compositions as desired.

Alternatively, the copolymers may be used in molded objects, e.g., food containers where the combination of low solubles content, and good stiffness and toughness is advantageous.

Manufacture

Impact polypropylene copolymers can be produced in slurry polymerization processes conducted in inert hydrocarbon solvents, bulk polymerization processes conducted in liquefied monomers such as liquefied propylene, and in a gas phase polymerization process. Gas phase processes with a fluidized bed are preferable, especially a two reactor system wherein the homopolymer phase is made in the first reactor and the copolymer rubber phase in the second reactor. Such a process provides for in situ blending of the polymers, which blending is preferred over simple physical blending.

The catalysts for use in such systems include:

A. Ziegler-Natta catalysts, including titanium based catalysts such as those described in U.S. Pat. Nos. 4,376,062, 4,379,758, and 5,066,737. Ziegler-Natta catalysts are typically are magnesium/titanium/electron donor complexes used in conjunction with an organoaluminum cocatalyst and an external selectivity control agent, such as an alkoxy silane.

B. Chromium based catalysts such as those described in U.S. Pat. Nos. 3,709,853; 3,709,954; and 4,077,904.

C. Vanadium based catalysts such as vanadium oxychloride and vanadium acetylacetonate, such as described in U.S. Pat. No. 5,317,036.

D. Cationic forms of metal halides, such as aluminum trihalides.

E. Cobalt catalysts and mixtures thereof such as those described in U.S. Pat. Nos. 4,472,559 and 4,182,814.

F. Nickel catalysts and mixtures thereof such as those described in U.S. Pat. Nos. 4,155,880 and 4,102,817.

G. Rare Earth metal catalysts, i.e., those containing a metal having an atomic number in the Periodic Table of 57 to 103, such as compounds of cerium, lanthanum, praseodymium, gadolinium and neodymium.

H. Metallocene catalysts, i.e., organometallic coordination complexes of one or more ligands in association with a metal atom. Also included are the general class of single-site catalysts.

In accordance with the process, discrete portions of the catalyst components are continually fed to the reactor in catalytically effective amounts together with the propylene (and possibly comonomer) while the polymer product is continually removed during the continuing process. Fluid bed reactors useful for this purpose are described, e.g., in U.S. Pat. Nos. 4,302,565, 4,302,566 and 4,303,771. It is preferable to operate same in condensing mode, induced condensing mode or liquid monomer mode.

For example, in the first reactor propylene or a mixture of propylene and, optionally, at least one olefin having 2 to 8 carbon atoms is introduced together with hydrogen and catalyst into the first reactor. The mole ratio of hydrogen to propylene alone or combined propylene and olefin is in the range of about 0.001 to about 0.45 and is preferably about 0.004 to about 0.1.

A mixture of homopolymer or copolymer of propylene with active catalyst embedded in the polymer matrix is produced in the first reactor. This mixture from the first reactor is transferred to the second reactor to which no additional solid catalyst need be added. Additional cocatalyst and/or electron donor optionally may be added to the second reactor. In the second reactor, for example, ethylene and propylene are maintained at a gas phase composition in a range of mole ratio of about 0.1 to about 10 moles of ethylene per mole of propylene, and preferably about 0.1 to about 5.0 moles of ethylene per mole of propylene.

EXAMPLES

Example 1

Three copolymers with IVR's of about 1.3–1.5 were manufactured and extruded into pellets on a 1¼ inch (3.1 cm) screw diameter (with mixing screw), Brabender single-screw extruder. The additives used were 1,000 ppm of IRGANOX-3114, 1,000 ppm of IRGAFOS 168 organo phosphite, 3,000 ppm of MYVEROL® glyceryl monostearate and, 800 ppm of DHT-4A hydrotalcite-like material (i.e., an acid acceptor). Four control copolymers were produced as well with the same additives.

The copolymer compositions were as follows:

TABLE 1

MELT FLOWS AND INFRARED ANALYSES

| SAMPLE # | MELT FLOW, dg/min | $E_c$, % w | $F_c$, % w | IVR |
|---|---|---|---|---|
| 3 | 12.2 | 85 | 29 | |
| 6 | 7.0 | 85 | 28 | |
| 13* | 11.0 | 84 | 28 | — |
| CTL-1 | 8 | 60 | 18 | 1.5 |
| CTL-2 | 8 | 45 | 19 | 1.2 |
| CTL-3 | 18 | 45 | 20 | 1.2 |
| CTL-4 | 18 | 60 | 21 | 1.5 |

* Visbroken from sample 6.

Cast films were prepared on a ¾ inch (2.0 cm) screw diameter Brabender single-screw extruder with a melt temperature of 230° C. and at 60–70 rpm. The films were subjected to the FDA extraction procedure (21 CFR 177.1520) with the following result:

TABLE 2

| SAMPLE | HEXANE SOLUBLES, % w* |
|---|---|
| 3 | 1.8 |
| 6 | 1.6 |
| 13 | 1.5 |

The copolymers fell within the acceptable maximum solubles limit for cooking applications (2.6% at 50° C.).

Gloss, haze and clarity results are shown in Table 3 for cast films of this invention.

TABLE 3

HIGH $E_c$ PRODUCTS FILM PROPERTIES

| Sample | Gloss | Haze (%) | Clarity (%) | Tear Strength (grams/mil) |
|---|---|---|---|---|
| 3 | 19.30 | 56.90 | 0.10 | 20.00 |
| 6 | 28.90 | 9.70 | 4.50 | 32.00 |
| 13 | 18.40 | 54.85 | 0.10 | 28.00 |

Materials of the invention suggested a reduction in cast film clarity with increasing melt flow, whether visbroken or not.

Elmendorf tear tests (ASTM D-1922) were conducted for these materials with tear in the machine direction (MD) (Table 4). The results showed that visbreaking did not lower the tear strength.

From cast films, tensile properties (ASTM D-882) were obtained for the inventive materials from microtensiles on the nominally 3–4 mil thick films, and the reference products from one inch (2.5 cm) wide strips with a two inch (5 cm) gauge length using the 1–1.4 mil thick reference films. The crosshead speed was 2.2 in/min (5.6 cm/min). The film tensile test results are reported in Table 4.

TABLE 4

TENSILE PROPERTIES OF CAST FILMS

| Sample | Approx. Modulus (Manual Young's) MPa | | Yield Stress, Mpa | | Break Stress, Mpa | | Break Elong., % | |
|---|---|---|---|---|---|---|---|---|
| | MD | TD | MD | TD | MD | TD | MD | TD |
| CTL-1 | 568 | 457 | 16.3 | 13.6 | 29.9 | 21.9 | 594 | 539 |
| CTL-2 | 481 | 395 | 14.6 | 11.4 | 34.7 | 18.7 | 634 | 499 |
| CTL-3 | 472 | 322 | 14.4 | 12.3 | 25.8 | 17.7 | 663 | 462 |
| CTL-4 | 461 | 314 | 14.4 | 10.9 | 21.8 | 14.3 | 541 | 445 |
| 3 | 445 | 483 | 14.2 | 14.7 | 25.7 | 23.0 | 662 | 613 |
| 6 | 532 | 491 | 19.0 | 17.5 | 33.6 | 28.5 | 757 | 669 |
| 13 | 598 | 444 | 20.9 | 15.8 | 31.7 | 24.0 | 702 | 559 |

Examination of Table 4 reveals that of the seven materials, the materials of the invention ranked in the top three 16 times for all the properties measured, while the reference materials had only 3 such measurements. The balance of tensile yield strength in the MD to that in the transverse direction (TD) using data in Table 5 is shown in Table 5.

TABLE 5

BALANCE OF MD AND TD TENSILES

| | Yield Stress, MPa | | Ratio, |
|---|---|---|---|
| Sample | MD | TD | MD/TD |
| CTL-1 | 16.3 | 13.6 | 1.20 |
| CTL-2 | 14.6 | 11.4 | 1.28 |
| CTL-3 | 14.4 | 12.3 | 1.17 |
| CTL-4 | 14.4 | 10.9 | 1.32 |
| 3 | 14.2 | 14.7 | 0.966 |
| 6 | 19.0 | 17.5 | 1.09 |
| 13 | 20.9 | 15.8 | 1.32 |

The ratio of MD to TD tensile yield stress is more balanced for the copolymers of the invention, excepting the visbroken sample 13. As is seen in Table 4, sample 13 exhibited an unexpected improvement (relative to sample 6) in machine direction properties for sample 13. For conventional impact copolymers (compare CTL-2 to CTL-3), visbreaking tends to maintain or lower, but not increase MD tensile properties. Thus, for the non-visbroken copolymers of the present invention there is an improved balance of MD and TD tensile properties.

Example 2

Four copolymer powders, A–D, were made, each having a nominal melt flow (MF) of 7 gm/10 minutes and nominal β/α of 1.6. The $E_c$ and $F_c$ of the polymers is set forth in Table 6 below. The copolymer powders were compounded into pellets, using a 1¼ inch (3.2 cm) Brabender extruder with Maddock mixing section at 250° C. melt temperature, 100 RPM, under nitrogen blanket. The additive package used was IRGANOX® 1010 phenolic antioxidant (750 ppm), SANDOSTAB® P-EPQ phosphonite (750 ppm) and REHEIS® L55RII hydrotalcite (Mg Al hydroxy carbonate hydrate 300 ppm). The pellets were extruded into 2 mil thick cast films using a ¾ inch (1.9 cm) Brabender extruder at 240° C. melt temperature, 8 inch (20 cm) slot die and Killion chill roll (17° C.).

Film property testing was conducted as follows: tensile properties by ASTM D-882; Elmendorf tear strength by ASTM D-1922; pendulum impact (Spencer) by ASTM D-3320; puncture resistance by Instron at 10 inch/minute (25.4 cm/min) crosshead speed. Haze was measured by ASTM D-1003, and gloss by ASTM D-523.

The optical properties of the films are presented in Table 6:

TABLE 6

| Polymer | $E_c$ (nominal) | $F_c$ | Haze (%) | Gloss (60°) |
|---|---|---|---|---|
| A | 51 | 20.9 | 60.8 | 17.2 |
| B | 51 | 40.8 | 56.0 | 17.0 |
| C | 82 | 21.1 | 65.0 | 15.1 |
| D | 82 | 41.2 | 31.8 | 40.3 |

Polymers A and B represent conventional impact copolymers. Polymers C and D (high $E_c$) are copolymers according to this invention. The first three films had comparable haze and gloss values. The combination of high $F_c$ and high $E_c$ gives film of significantly reduced haze and higher gloss.

Figure 2:
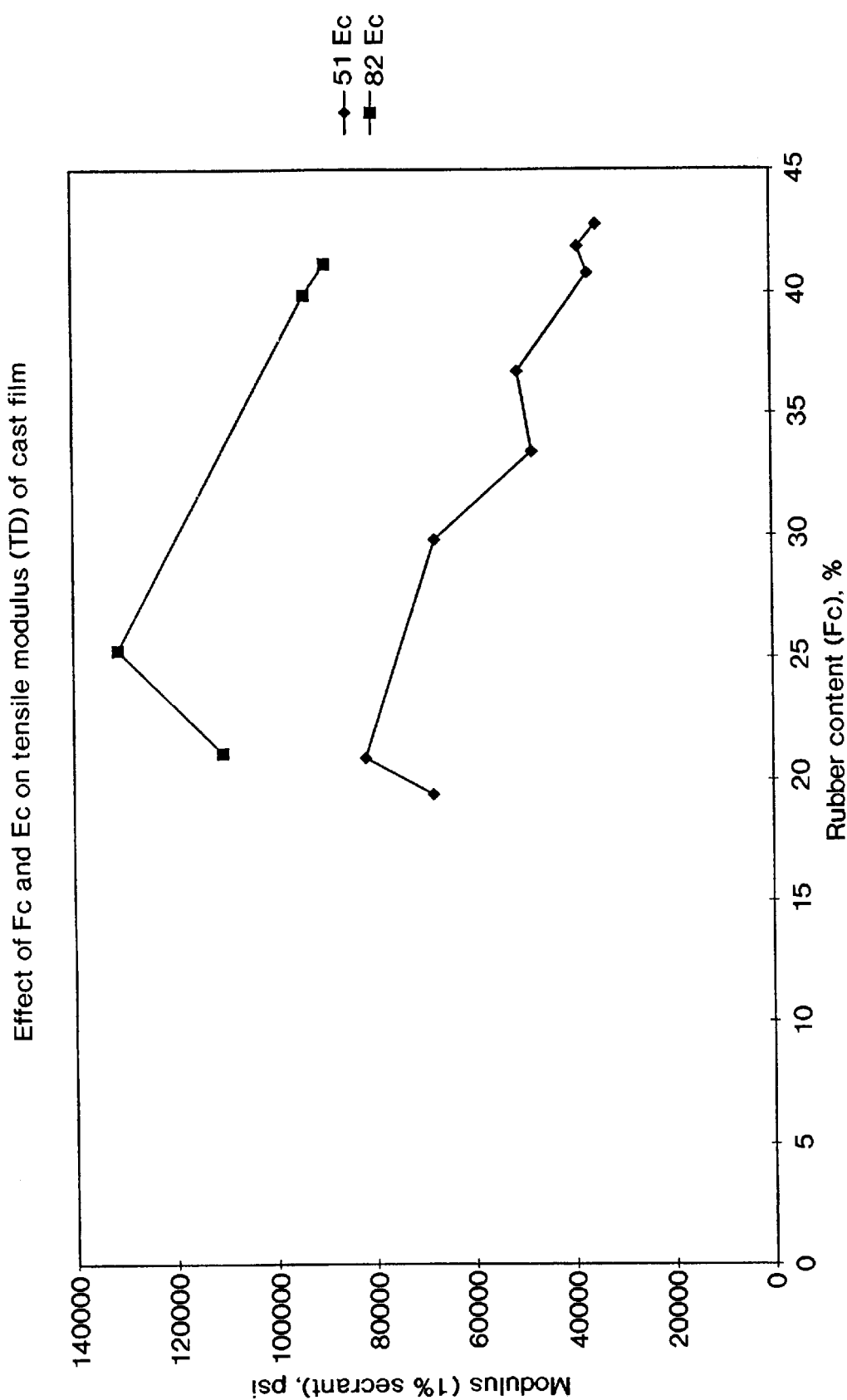
Figure 3:
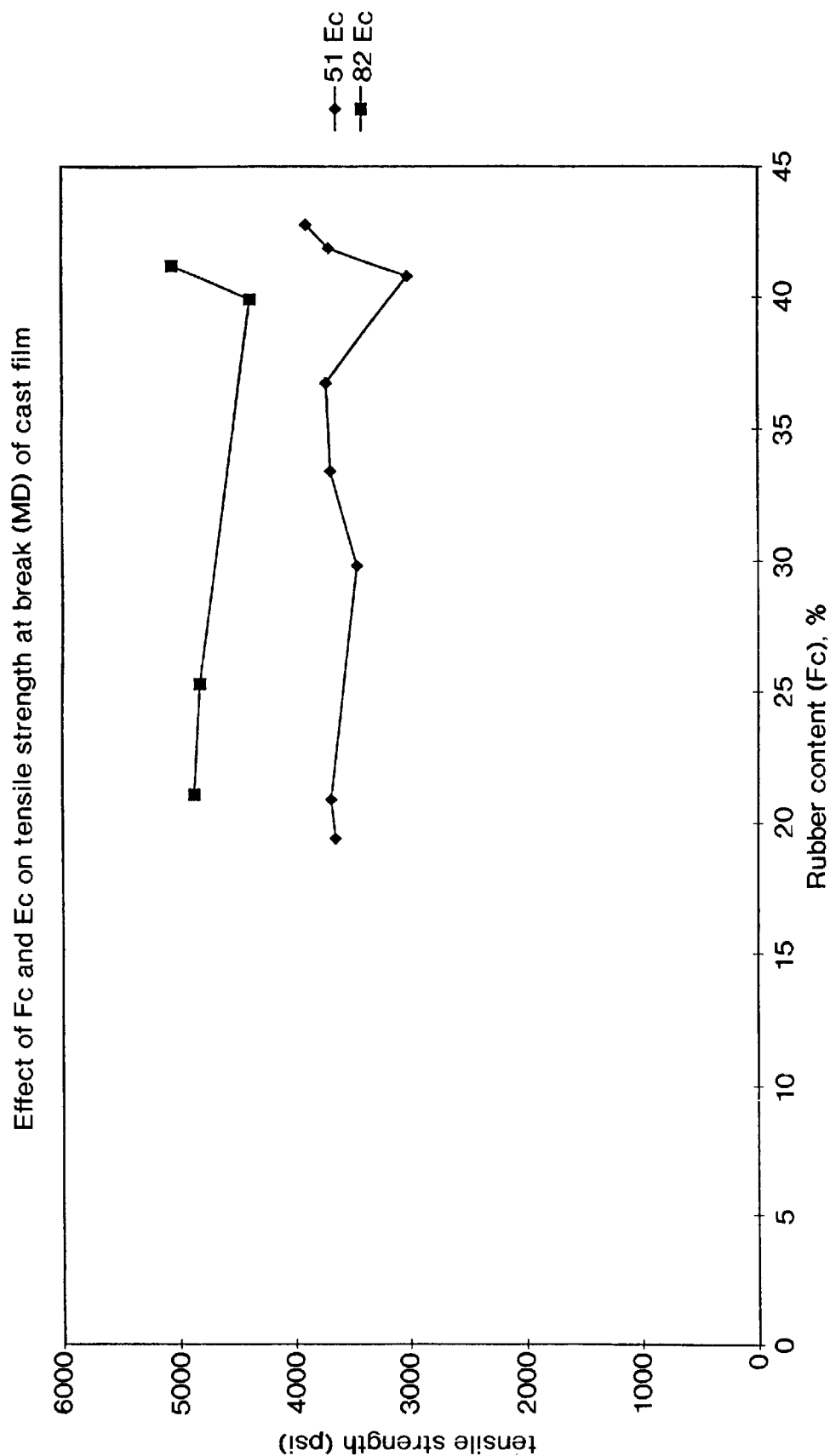
Figure 4:
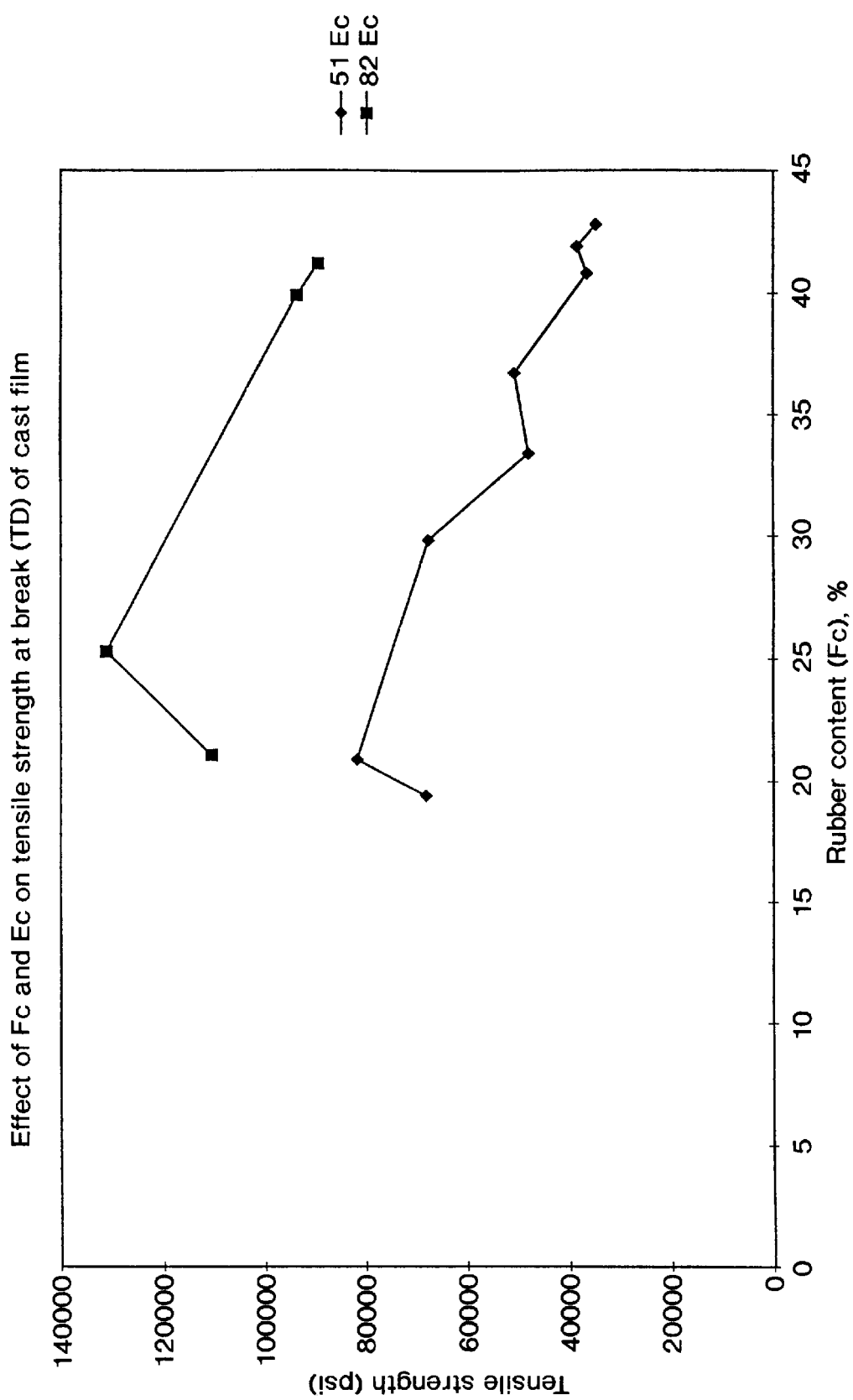
Figure 5:
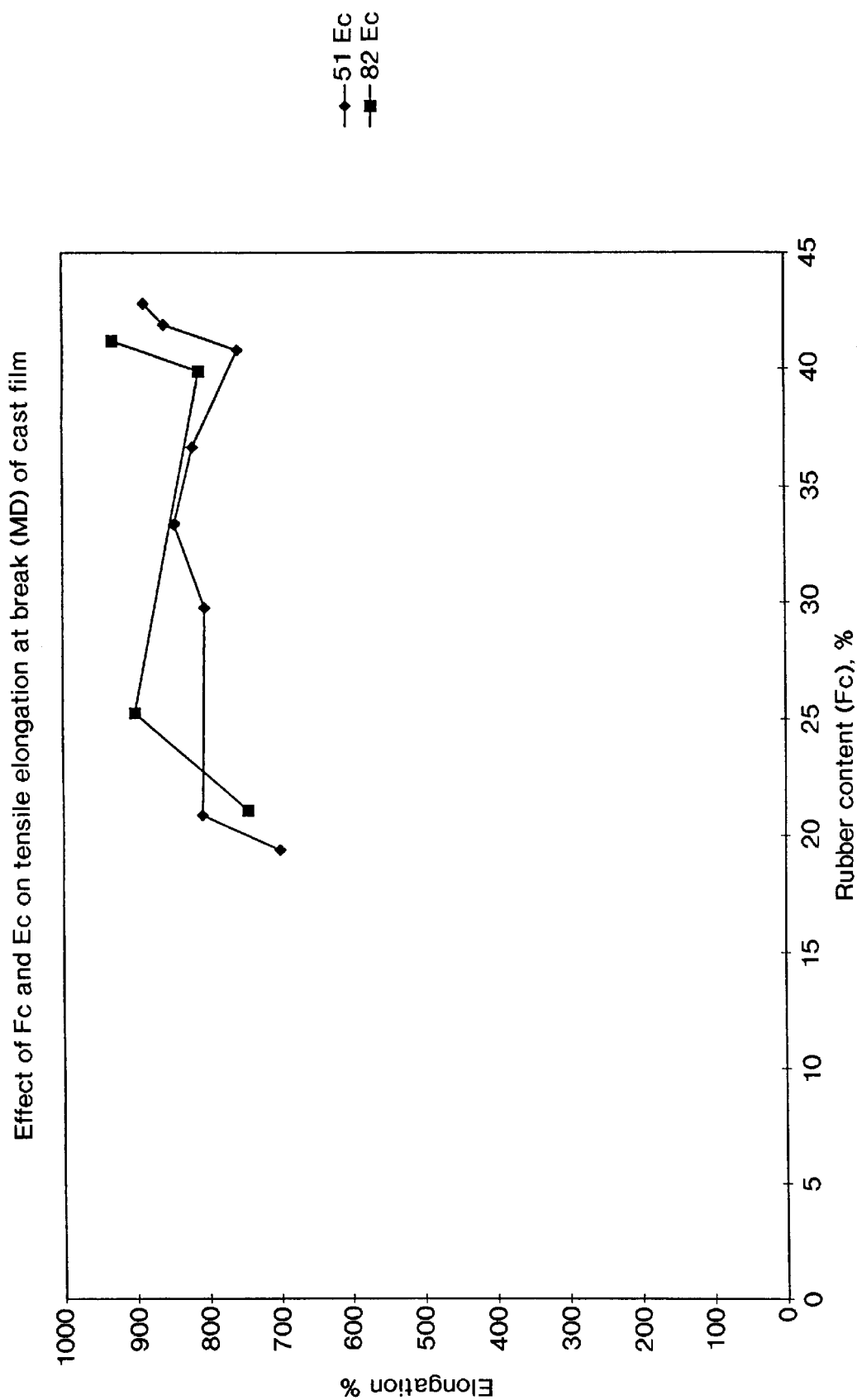
Figure 6:
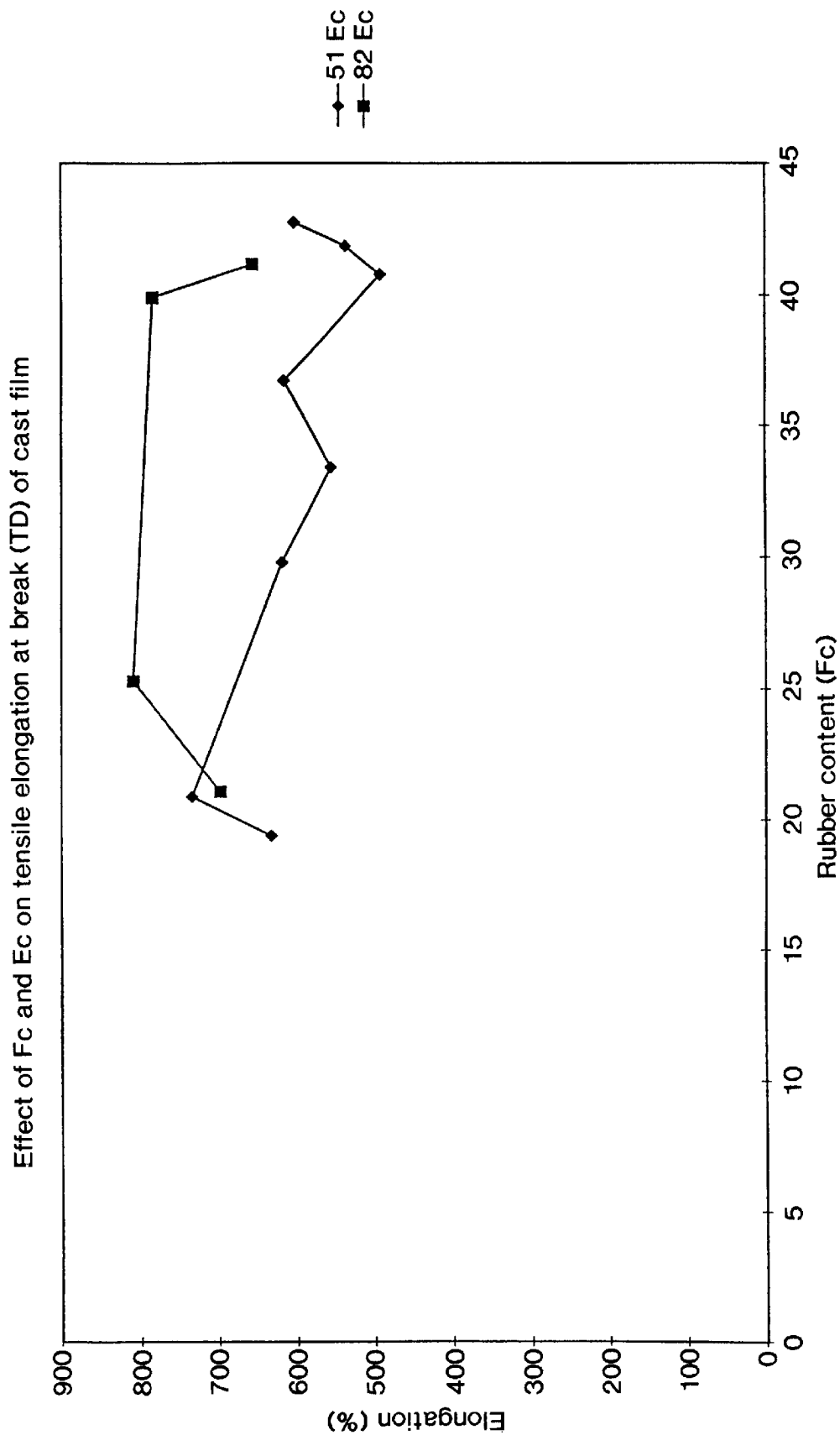
Figure 7:
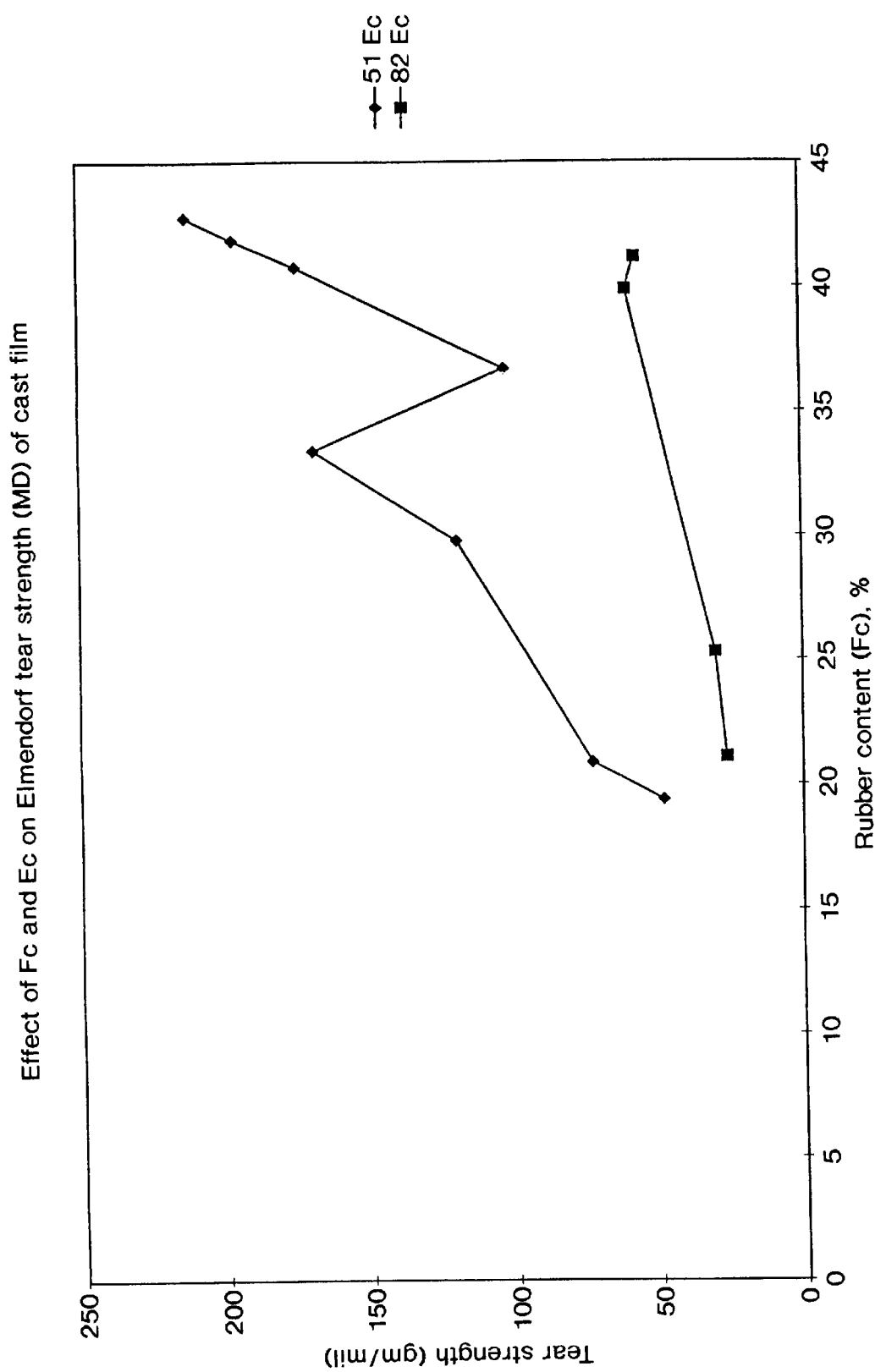
Figure 8:
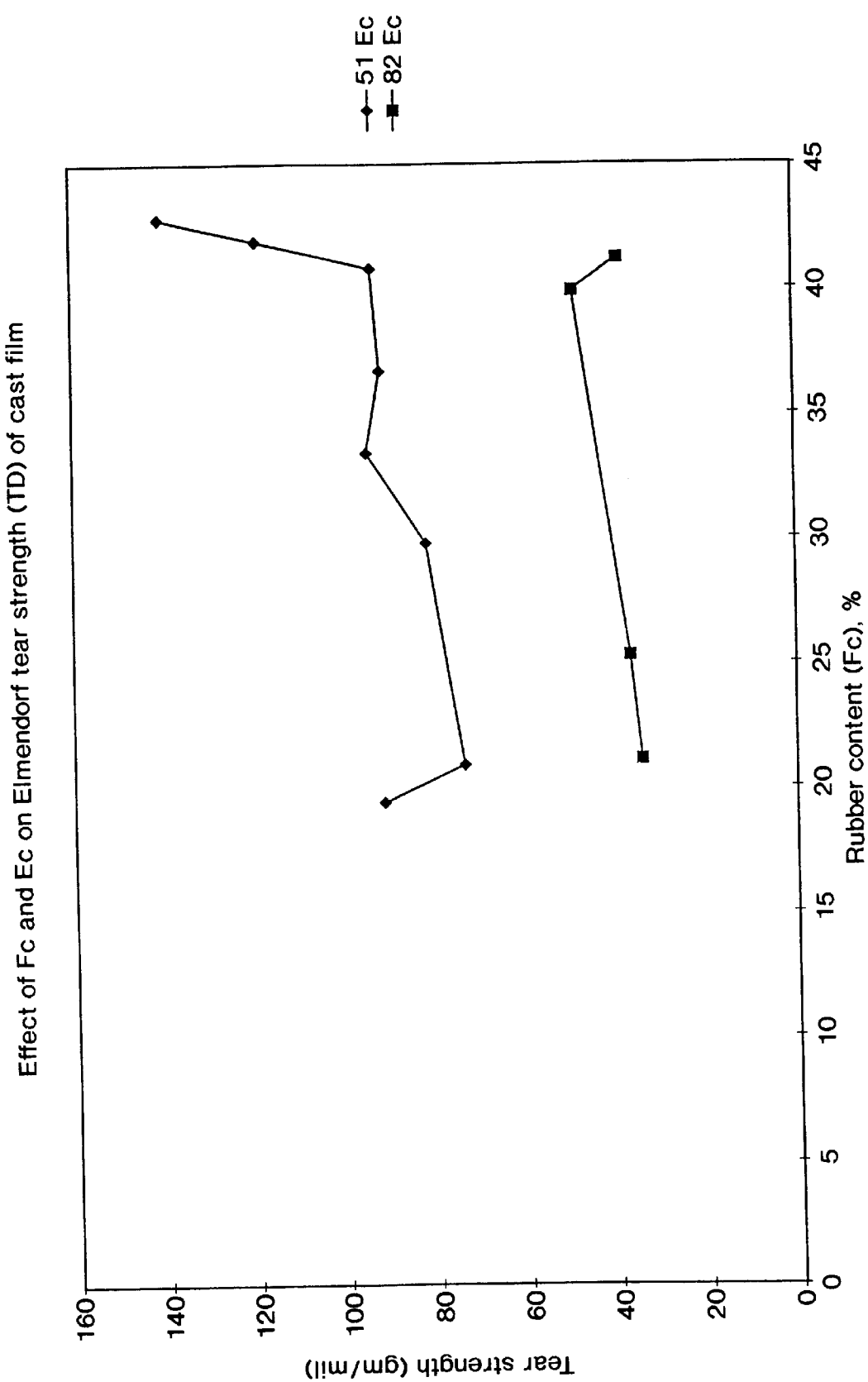
Figure 9:
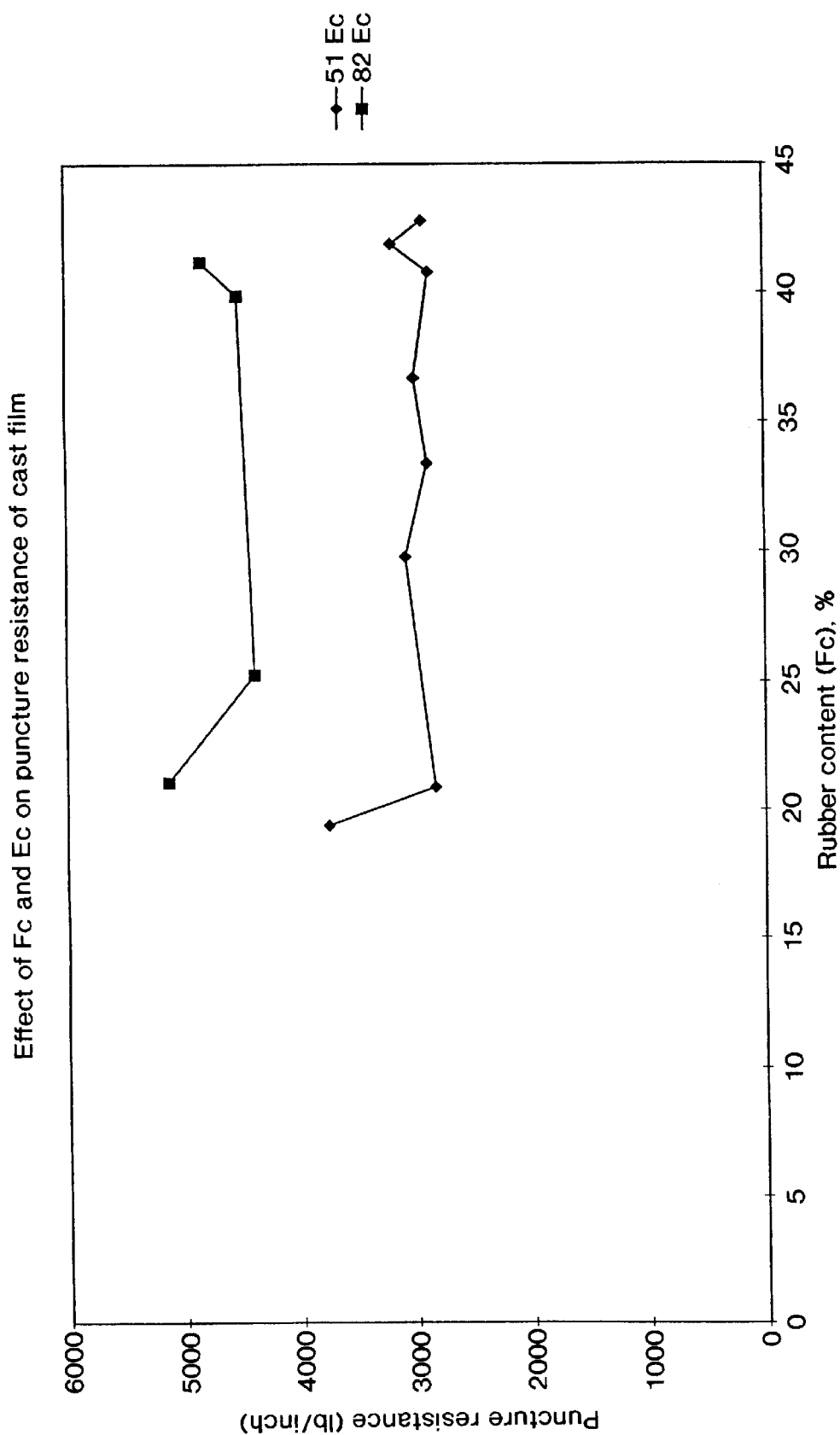
Figure 10:
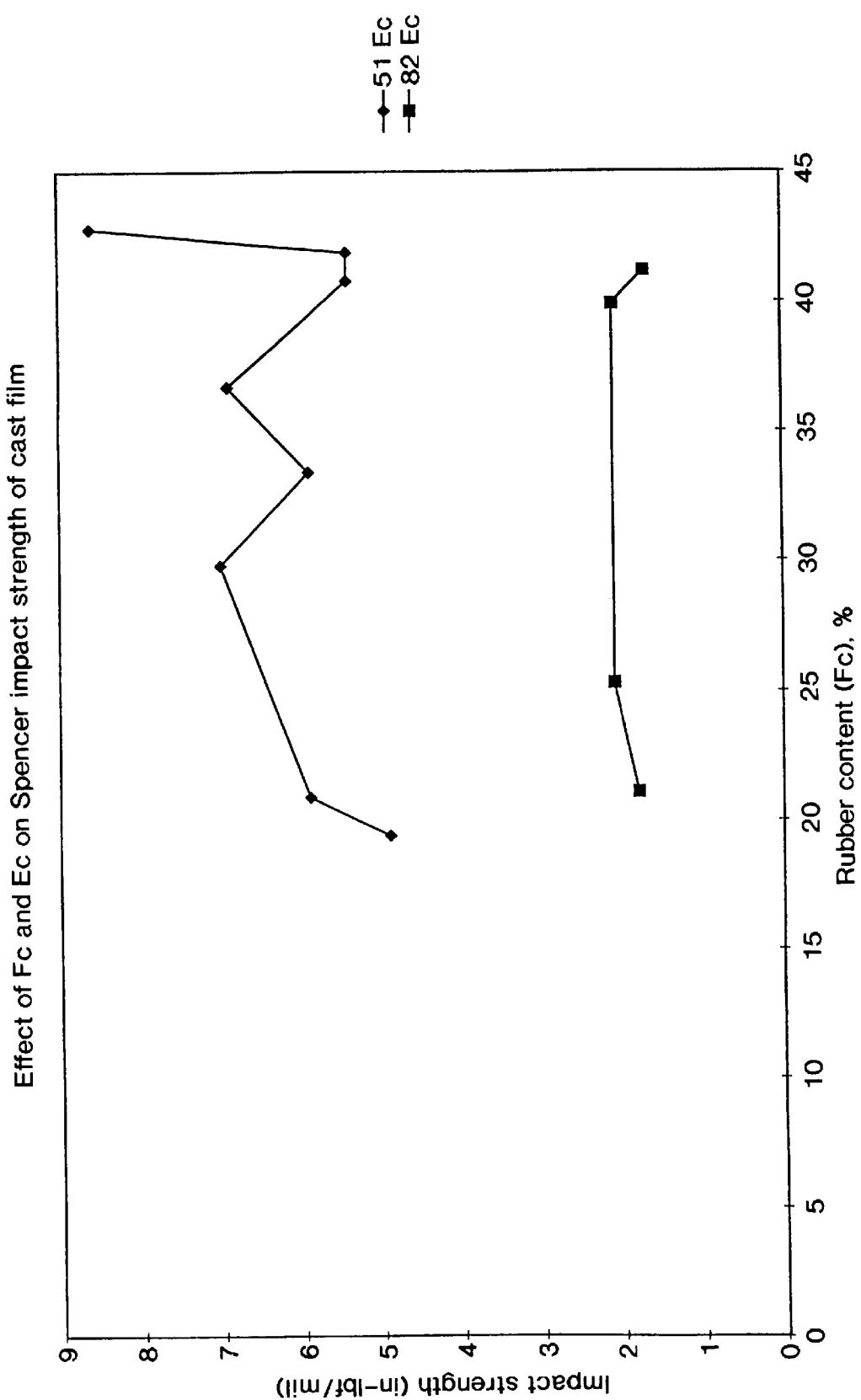

FIGS. 1 and 2 show that with increasing $F_c$ tensile modulus decreases, but higher modulus is obtained at higher $E_c$. FIG. 3 shows that $F_c$ had a minor effect on MD tensile strength, but higher $E_c$ film had higher tensile strength. FIG. 4 shows that TD tensile strength decreases with increasing $F_c$; again higher tensile strength is achieved with higher $E_c$ films. FIGS. 5 and 6 show that generally $F_c$ has minor effect on elongation at break, but with higher $E_c$ elongation is comparable to or greater than those at lower $E_c$. FIGS. 7 and 8 show that with increasing $F_c$ tear strength of film increases. However at higher $E_c$ tear strength decreases. FIG. 9 shows that with increasing $F_c$ puncture resistance of film is affected only slightly, but higher $E_c$ gives higher puncture resistance. FIG. 10 shows that with increasing $F_c$ impact strength of film tends to increase at 51 $E_c$; at 82 $E_c$ impact strength is relatively low throughout the $F_c$ range studied. Note that higher $E_c$ reduces impact resistance.

Thermal analysis experiments on these four copolymers also were performed using Perkin-Elmer 7 series DSC instrument under nitrogen. For melting and crystallization a standard heat-cool-heat procedure was used. The heating rate was 10° C./minute. The melt was cooled at 10° C./min; the peak was taken as the crystallization temperature (Tc). From the second heating (which followed a controlled and known crystallization history) melting temperature (Tm) and % crystallinity were measured.

Isothermal crystallization half time (ICHT) was measured by first heating the polymer under nitrogen at 500°C./minute to 230° C., holding the melt at that temperature for 3 mins (to melt residual crystals and destroy other remnants of order), cooling at 500° C./minute to 120° C., and then held at that temperature isothermally till the polymer crystallized. The time to the peak was taken as ICHT at 120° C.

Figure 11:
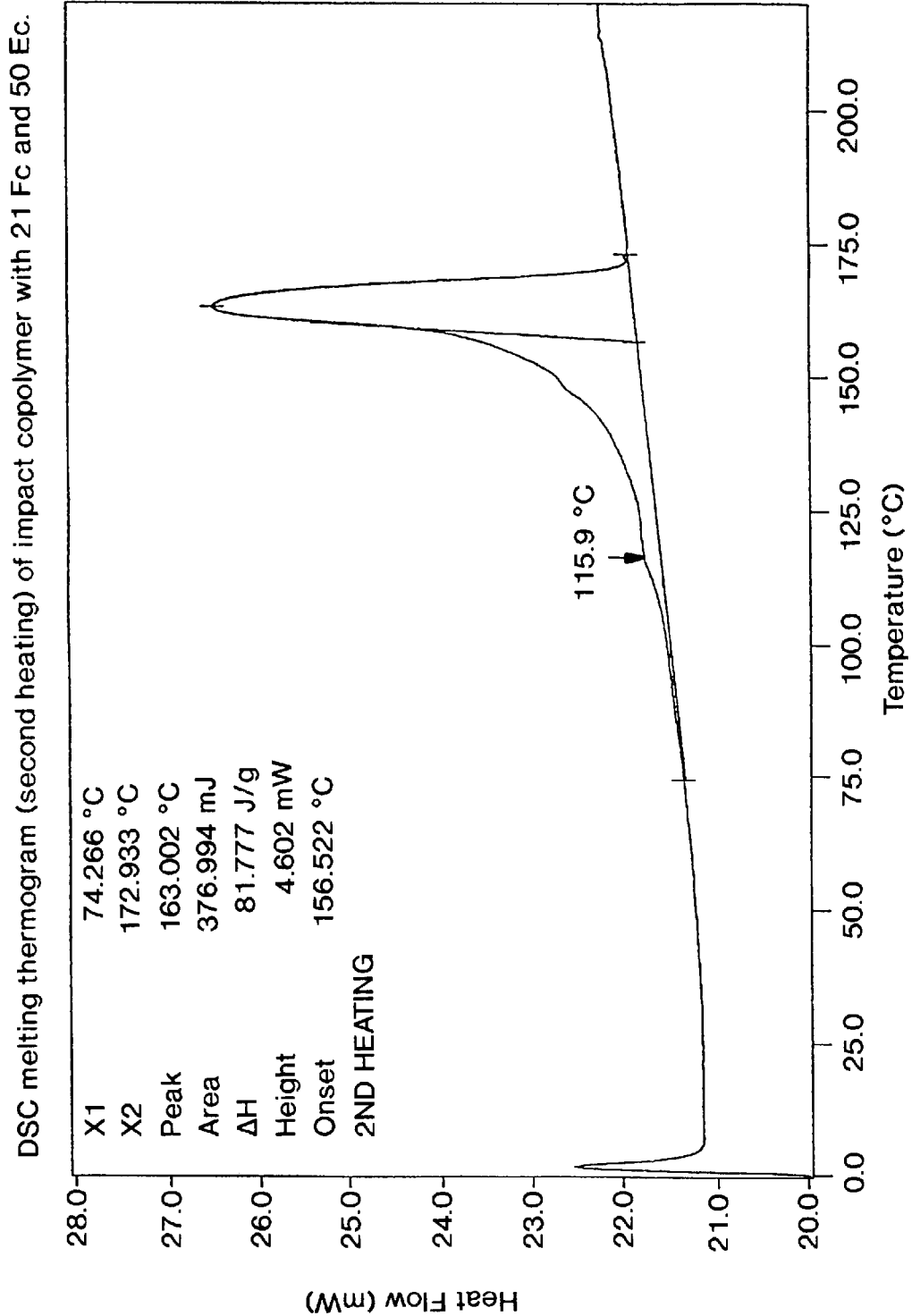
Figure 12:
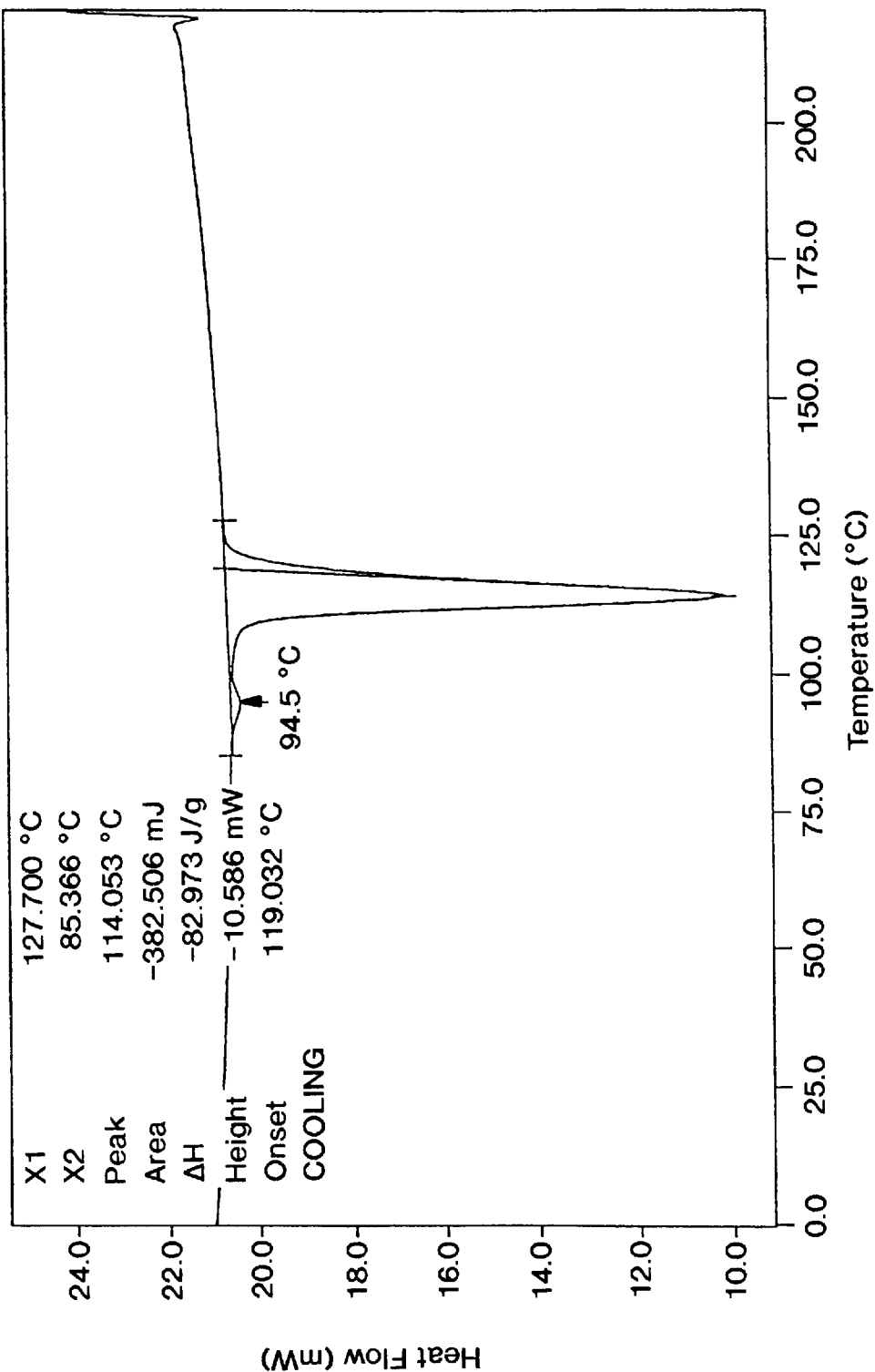
Figure 13:
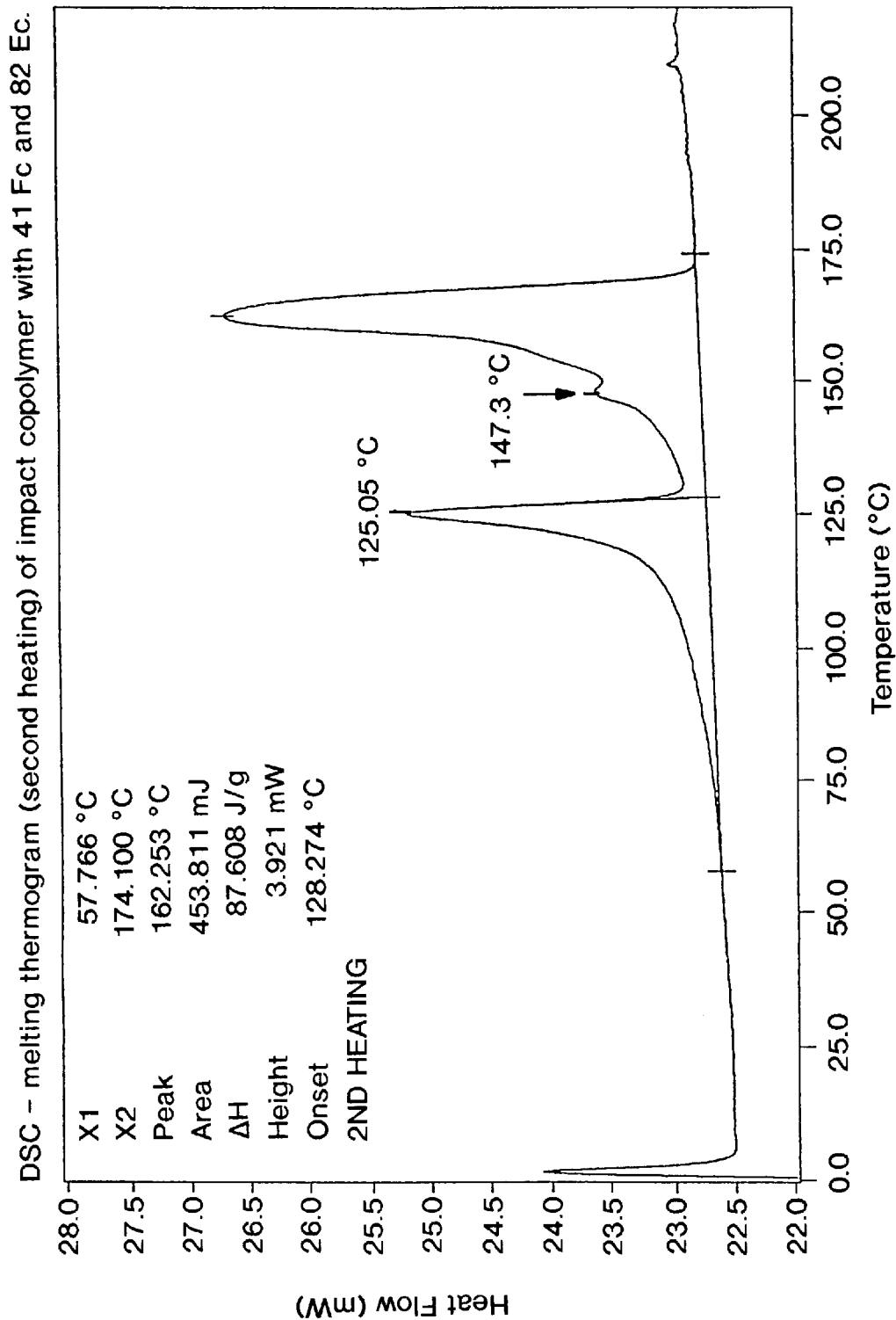

FIGS. 11–14 show the melting and crystallization thermograms of the 4 copolymers. FIG. 11 shows the melting endotherm of conventional impact copolymer A. It has two melting peaks; the main peak at 163° C., due to the melting of the homopolymer phase. The tiny peak ("$E_c$ peak") at 115.9° C. is due to low level of polyethylene-like crystallinity in the rubber phase. In FIG. 12 the main crystallization peak is due to homopolymer, and the smaller peak is due to polyethylene-like material.

Figure 14:
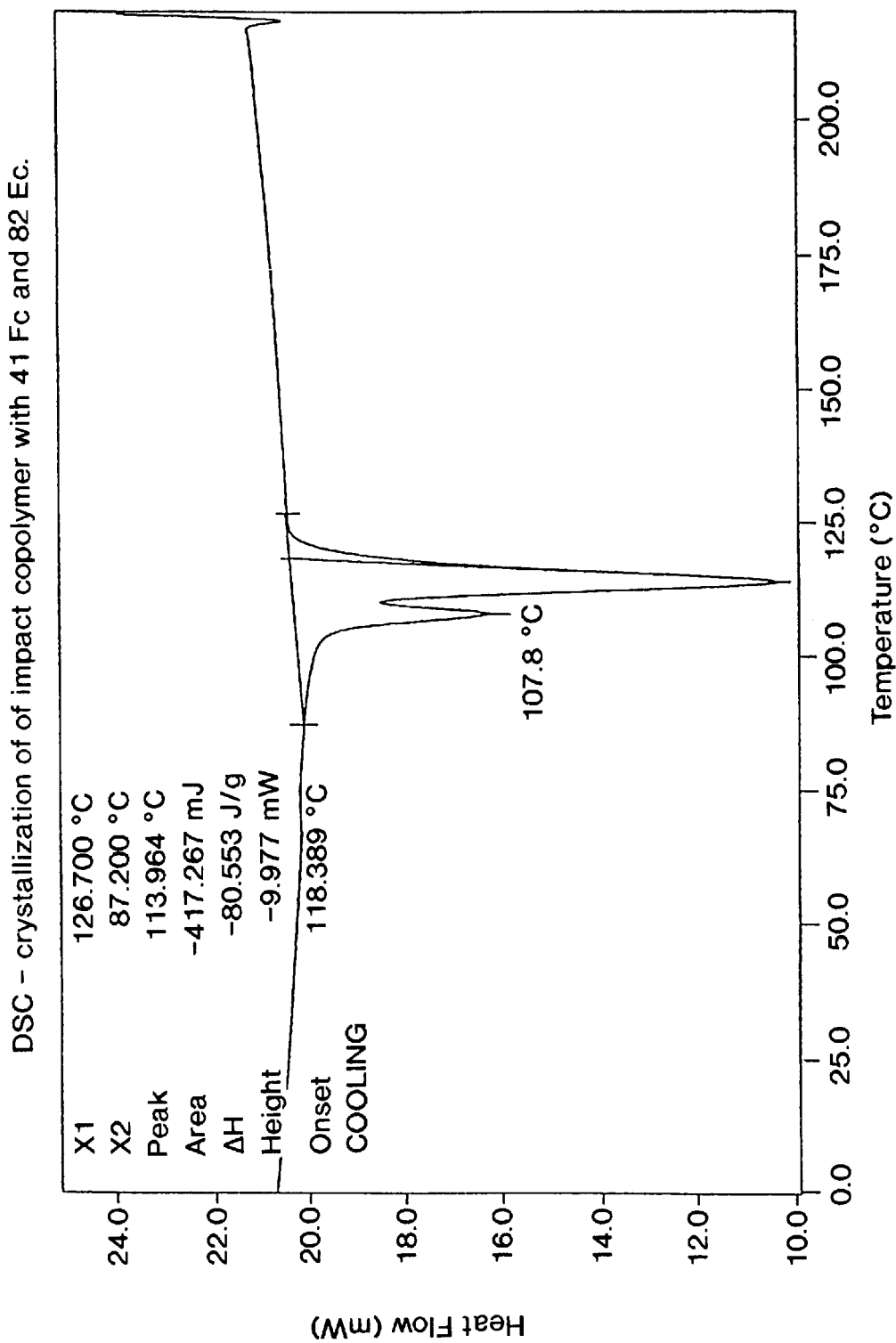

In contrast at high $F_c$ and high $E_c$ (copolymer D), the $E_c$ peak became more prominent for both melting (FIG. 13) and crystallization (FIG. 14). From the heats of fusion of the $E_c$ peaks, the polyethylene-like crystallinity was estimated (Table 7).

Table 7 shows the Tc (in ° C.), Tm (° C.), and Xc of the rubber phase. For the homopolymer phase Tc and Tm are also shown. ICHT data (average of duplicates) at 120° C. for the four samples are also shown. Samples B, D and C had similar ICHT; sample A apparently had a slightly higher ICHT, i.e., slower crystallization rate.

At 21 $F_c$, increasing $E_c$ from 51 to 82 increased the Tm, Tc and Xc of the $E_c$ phase, but had no (or slight) effect on homopolymer Tm and Tc. At 41 $F_c$, increasing $E_c$ from 51 to 82 had a similar effect on Tm and Tc of both the phases and increased $E_c$ crystallinity significantly.

At about 51 $E_c$, increasing $F_c$ from 21 to 41 slightly increased Tm, Tc and Xc of the $E_c$ phase, but had no effect on homopolymer Tm and Tc. At 82 $E_c$, increasing $F_c$ from 21 to 41 showed no effect on the rubber phase Tm and Tc, but Xc increased, and there was a minor effect on homopolymer Tm.

TABLE 7

| Polymer | $F_c$ | $E_c$ | Rubber Phase Tc | Tm | Xc % | Homopolymer Tc | Tm | ICHT (sec) |
|---|---|---|---|---|---|---|---|---|
| A | 20.9 | 51 | 94.5 | 115.9 | 0.2 | 114.1 | 163.0 | 100 |
| B | 40.8 | 51 | 98.9 | 117.4 | 0.8 | 114.0 | 162.8 | 92 |
| C | 21.1 | 82 | 108.2 | 125.1 | 2.7 | 114.0 | 164.5 | 88 |
| D | 41.2 | 82 | 107.8 | 125.1 | 7.1 | 114.0 | 162.3 | 94 |

Compared to conventional impact copolymers A and B, the high $E_c$ copolymers (particularly D), have increased rubber phase crystallinity.

Table 8 shows that at higher $E_c$, tensile modulus, tensile strength and puncture resistance of film are improved, compared to lower $E_c$. Furthermore, at 82 $E_c$, the film has higher tear resistance at higher rubber content (this is also true at 51 $E_c$). Thus, the high $E_c$, high $F_c$ film has particularly useful balance of film properties. The loss of tear strength due to high $E_c$ is partially recovered by increasing $F_c$. In contrast, the high $E_c$, low $F_c$ film has high modulus, tensile strength and puncture resistance, but relatively lower tear strength, compared to high $E_c$, high $F_c$ film.

TABLE 8

| Polymer | Tensile Modulus (MPa) | | Tensile Strength at break (MPa) | | Elmendorf Tear Strength | | Puncture resistance (gm/cm) | Spencer Impact Strength (N.m/m) |
|---|---|---|---|---|---|---|---|---|
| | MD | TD | MD | TD | MD | TD | | |
| A | 630.32 | 563.44 | 25.40 | 20.79 | 185,166 | 186,690 | 505,024 | 26,000 |
| B | 449.47 | 251.52 | 20.79 | 10.53 | 442,722 | 236,474 | 511,989 | 24,000 |
| C | 794.97 | 761.88 | 33.59 | 25.67 | 67,056 | 87,122 | 917,008 | 8,000 |
| D | 796.35 | 617.08 | 34.86 | 21.64 | 144,272 | 98,044 | 862,184 | 7,600 |

We claim:

1. A composition comprising:
an impact copolymer composition comprising a blend of (i) a propylene polymer phase comprising a polypropylene homopolymer or a propylene copolymer containing up to 5 weight percent of an olefin monomer unit other than propylene, and (ii) a rubber phase in an amount of from about 40 to about 60 weight percent of the impact copolymer, wherein the rubber phase has an ethylene content of about 82 to about 95 weight percent and the remainder propylene wherein the crystallinity as measured by differential scanning calorimetry (DSC) of the rubber phase is between about 2% and about 15%.

2. A composition according to claim 1 wherein the propylene polymer phase is a copolymer that contains up to five weight percent of ethylene.

3. A composition according to claim 1 wherein the impact copolymer composition is an in situ blend of the propylene polymer phase and the rubber phase.

4. A composition according to claim 1 wherein the impact copolymer composition is peroxide cracked to a cracking ratio of less than about 2:1.

5. A composition according to claim 1 wherein the propylene polymer phase has a xylene soluble content at 23° C. of less than about 5% weight percent.

6. A composition according to claim 1, wherein the rubber phase has a crystallization temperature according to differential scanning calorimetry (DSC) above about 107° C. and a melting temperature according to differential scanning calorimetry (DSC) above about 125° C.

7. A composition according to claim 1 wherein the crystallinity as measured by differential scanning calorimetry (DSC) of the rubber phase is between about 7% and about 15% and the rubber phase comprises between 40 and 50% by weight of the impact copolymer composition.

8. A cast film prepared by extruding the composition according to claim 1.

9. The cast film according to claim 8, wherein the ratio of tensile yield stress in the machine direction to transverse direction is about 1±0.2.

* * * * *